(12) United States Patent
Peterson et al.

(10) Patent No.: US 7,681,818 B2
(45) Date of Patent: Mar. 23, 2010

(54) MIXING AND GRINDING EDIBLE FAT-BASED SLURRIES AND EMULSIONS USING A VIBRATORY DRUM

(75) Inventors: Roy Peterson, Chattanooga, TN (US);
Stephen E. Beavers, Cleveland, TN (US); Jonathan Hipps, Bidd Lake, NJ (US); Peter T. Kashulines, Jr., Mountain Lakes, NJ (US); Michael Hill, Harrison, TN (US); Barry D. Glazier, Harrisburg, PA (US); Kenneth G. Weaber, Jr., Lancaster, PA (US); Ronald P. Layton, Jr., Bangor, PA (US); David J. Pontzer, Sparta, NJ (US)

(73) Assignee: General Kinematics Corporation, Crystal Lake, IL (US)

( * ) Notice: Subject to any disclaimer, the term of this patent is extended or adjusted under 35 U.S.C. 154(b) by 617 days.

(21) Appl. No.: 11/555,520

(22) Filed: Nov. 1, 2006

(65) Prior Publication Data

US 2007/0054030 A1 Mar. 8, 2007

Related U.S. Application Data

(63) Continuation of application No. 10/366,509, filed on Feb. 14, 2003, now abandoned.

(51) Int. Cl.
*B02C 17/14* (2006.01)
*B01F 11/00* (2006.01)

(52) U.S. Cl. .................. 241/153; 241/175; 366/111; 366/226

(58) Field of Classification Search ......... 366/108–116, 366/124–128, 219, 225–226, 228–229; 241/153, 241/175; 451/85, 326, 328

See application file for complete search history.

(56) References Cited

U.S. PATENT DOCUMENTS 2,789,773 A * 4/1957 Stauber
2,818,220 A * 12/1957 Woody
3,395,020 A   7/1968 Chozianin
3,774,855 A * 11/1973 Wolf
3,991,948 A   11/1976 Schober et al.

(Continued)

FOREIGN PATENT DOCUMENTS

| DE | 3224117 A1 | * | 12/1983 |
| JP | 53-82656 | * | 7/1978 |
| JP | 02237761 A | * | 9/1990 |
| JP | 07185377 A | * | 7/1995 |
| JP | 2004195384 A | * | 7/2004 |

(Continued)

OTHER PUBLICATIONS

General Kinematics, Vibra Drum brochure (1999).

(Continued)

*Primary Examiner*—Charles E Cooley
(74) *Attorney, Agent, or Firm*—Marshall, Gerstein & Borun LLP (57) ABSTRACT

A system, which may be used to perform simultaneous grinding and intimate mixing of edible fat-based slurries or emulsions, may include a cylindrical drum having a central longitudinal axis and a curved inner surface and mounted on springs, and a motor and tuned mass coupled to the cylindrical drum to vibrate the cylindrical drum about a center of vibration that is offset from the central longitudinal axis of the cylindrical drum. The system includes at least one pair of partition plates disposed at an angle to the longitudinal axis of the cylindrical drum to divide the cylindrical drum into at least two process zones, the partition plates of the at least one pair having matching apertures and moveable relative to each other between alignment and misalignment. The system may be used, for example, in chocolate manufacture.

14 Claims, 3 Drawing Sheets

U.S. PATENT DOCUMENTS

| | | | |
|---|---|---|---|
| 4,150,163 A | 4/1979 | Peterson | |
| 4,196,290 A | 4/1980 | Douros, Jr. et al. | |
| 4,224,354 A | 9/1980 | Szegvari | |
| 4,353,509 A | 10/1982 | Bostian, Jr. | |
| 4,561,598 A | 12/1985 | Musschoot | |
| 4,665,081 A | 5/1987 | Doi et al. | |
| 4,709,507 A * | 12/1987 | Musschoot | |
| 4,753,660 A * | 6/1988 | Kellerwessel et al. | 44/280 |
| 4,926,601 A * | 5/1990 | Musschoot | |
| RE33,542 E * | 2/1991 | Musschoot | |
| 4,998,678 A | 3/1991 | Durr | |
| 5,079,027 A | 1/1992 | Wong et al. | |
| 5,197,680 A | 3/1993 | Chauveau | |
| 5,201,471 A | 4/1993 | Janway et al. | |
| 5,297,743 A | 3/1994 | Tadema | |
| 5,512,008 A * | 4/1996 | Musschoot | |
| 5,536,203 A | 7/1996 | Takeyoshi et al. | |
| 5,570,848 A * | 11/1996 | Gock et al. | |
| 5,591,074 A | 1/1997 | Musschoot | |
| 5,945,150 A | 8/1999 | Lipp | |
| 6,238,724 B1 | 5/2001 | Carvallo et al. | |
| 6,296,891 B1 | 10/2001 | Zumbe et al. | |
| 6,743,386 B2 * | 6/2004 | Lease | |
| 2007/0054030 A1 * | 3/2007 | Peterson et al. | |
| 2007/0240741 A1 * | 10/2007 | Lease | 134/33 |
| 2009/0101476 A1 * | 4/2009 | Zorn et al. | 198/617 |
| 2009/0126219 A1 * | 5/2009 | Mathis et al. | 34/446 |

FOREIGN PATENT DOCUMENTS

| | | |
|---|---|---|
| JP | 2007290040 A * | 11/2007 |
| SU | 528081 | 11/1976 |
| SU | 1209136 | 2/1986 |

OTHER PUBLICATIONS

Harris, Manufacturing Confectioner pp. 26-33 (1976).
Minifie, Chocolate, Cocoa, and Confectionery: Science and Technology pp. 55-59, 107-108, 113-123 (2d ed. 1980).
Sweco, Grinding Mills brochure (1998).

* cited by examiner

MIXING AND GRINDING EDIBLE FAT-BASED SLURRIES AND EMULSIONS USING A VIBRATORY DRUM

This application is a continuation of U.S. patent application Ser. No. 10/366,509, filed Feb. 14, 2003, now abandoned, which is hereby incorporated by reference in its entirety.

BACKGROUND

The present invention is directed to methods for grinding and mixing edible fat-based slurries and emulsions in a vibratory media mill. The invention has particular application to the field of manufacture of chocolate. The present invention can be used advantageously to grind and mix any edible fat-based slurry or emulsion, but has special application in manufacturing chocolate.

Generally, chocolate is a dispersion or emulsion of very fine, solid ingredient particles suspended in a fat phase. (As used herein, an "emulsion" refers to a finely divided phase dispersed in a dissimilar continuous phase, including dispersions of finely divided solid particles in a continuous fat phase (such as in chocolate), oil-in-water (O/W) emulsions, water-in-oil (W/O emulsions), and the like. "Slurry" as used herein, refers to divided solids in a continuous liquid phase.)

Chocolate also may have different forms. For example, milk chocolate is a confection that contains milk solids, milk fat, chocolate liquor, a nutritive carbohydrate sweetener, cocoa butter and may include a variety of other ingredients such as emulsifying agents, flavorings and other additives. Crumb chocolate is a type of milk chocolate wherein wet milk, carbohydrate sweetener ingredients and, optionally, chocolate liquor are combined and then co-dried at elevated temperatures to form a milk crumb. The crumb is then processed into crumb chocolate.

Many different types of chocolate are identified on the basis of the relative amounts of milk or other dairy solids, chocolate liquor, cocoa solids and fat (mainly cocoa butter) contained in them. In some cases, types of chocolate can also be identified by the method used in manufacture or the suitability for a given end use. The type of chocolate used to make M&M's brand chocolate candies herein defined as "convenience chocolate," for example, is characterized by its relatively large average grain size of 40 microns. Typical fine chocolates have an average grain size less than 20 microns. Convenience chocolate also has a strong taste, making it suitable for use in confections such as M&M brand chocolate candies. Enrobing chocolate, which is liquid chocolate poured over other confections followed by solidification by cooling, has specific requirements: including a relatively low viscosity of 10,000 centipoise or less and low yield value.

The physical and textural properties of an edible, fat-based slurry or emulsion, such as chocolate, depend on the size of particles in the mixture and the degree to which the dispersed particles are mixed with the fat phase. These properties are conventionally controlled, at least in part, by grinding the particles to reduce their size and controlling the intimacy of mixing of the ingredients. Such grinding and mixing are related but distinct operations. In chocolate making, the grinding operation is typically performed on relatively low fat components in a roll refiner after which fat (cocoa butter) is added. The composition is then intimately mixed in a conche.

More particularly, this conventional process of manufacturing chocolate involves coarse grinding cocoa nibs into cocoa liquor, adding dried milk powder, sugar and some additional cocoa butter and then refining or fine grinding the mixture. The typical viscosity of a 28% fat slurry of 100-200 microns is 70,000 centipoise. The fine milling of this 28% fat slurry to 40 microns with a roll refiner converts the mixture to a sticky powder at 40 C.

A roll refiner is a precision machine usually comprising five rolls mounted vertically with the bottom feed roll offset from the other rolls. The rolls are made of cast steel and must meet extremely close tolerances with respect to their shape and surface characteristics. The operational tolerances of the roll refiner, including the distances between the rolls, the speed at which the different rolls rotate, the rate at which the rolls are cooled, and like considerations, similarly are small. Failure to operate within these tolerances can produce poor production results. A roll refiner must also be frequently cleaned and lubricated in order to operate properly. Accordingly, use of a roll refiner to make chocolate has certain disadvantages.

Further, after grinding in a roll refiner, the resulting paste is subjected to conching, or slow mixing, in a conche. In this operation, cocoa butter along with emulsifiers such as lecithin are added to and mixed with the ground particles, to form a reduced viscosity mixture. Whereas grinding in the refiner reduces particle size of the ingredients and increases viscosity, mixing of the ground paste and cocoa butter in the conche produces an intimate mixture of the ingredients, including the fat phase, to obtain lower viscosity at constant particle size. While the particle size may be somewhat reduced in the conche, the overall mixing process nevertheless lowers the viscosity of the chocolate ingredients.

The mixture is then worked in the conche at elevated temperatures to remove volatile ingredients and mellow the flavor and texture of the chocolate. Although many designs of conching equipment are known, the vast majority are batch machines, and all of them require substantial time, energy and labor to operate. Again, therefore, use of a conche has certain additional drawbacks.

A machine called the MacIntyre refiner/conche has also been used to make chocolate from raw ingredients. This equipment employs rotating scrape blades to simultaneously mix and crush the ingredients in the chocolate recipe in batch fashion. Although use of the MacIntyre refiner/conche is generally regarded as a simple and inexpensive way to make chocolate, the process performed by this unit is characterized by long batch times, which limit capacity. In addition, its operation and maintenance are complex.

Another alternative chocolate manufacturing apparatus is the so-called Wiener processor, which incorporates a ball mill to reduce or eliminate the need for a conventional roll refiner to produce ground chocolate particles. The components of the Wiener processor are the ball mill (known as a Wieneroto mill), a mixer conche and a "taste improver". The ball mill comprises a cylinder housing rotors and steel grinding balls. Material is pumped into the base of the cylinder at relatively high pressure thereby filling the cylinder. The material is then subjected to the grinding action of the balls, which are set in rotary motion by the rotors. The cylinder is ordinarily completely filled with material so that no empty head space remains. The particle size of the cocoa solids in the chocolate recipe is progressively reduced as the mixture traverses upwardly in the cylinder, and is separated from the grinding balls by a screen at the top of the cylinder. The mixture is then cycled between a mixing conche and the ball mill to obtain the chocolate emulsion. In the taste improver, thin streams of the product are exposed to heated air across their surface. This operation reduces moisture content, reduces viscosity and yield value and removes volatile constituents. Although the Wiener process eliminates the refining stage associated with conventional processes in which a roll refiner is used, operation of the ball mill itself is problematic. The process thus performed is complicated and does not eliminate conventional conching. In addition, high intensity grinding in the mill typically raises the temperature of the materials contained in it significantly, which can result in burning of the sugar components.

Given the state of the art described above, there is a long felt need for technology that can perform grinding and mixing of fat based materials in a single unit and that will thereby reduce the cost and complexity of chocolate manufacturing processes by reducing the reliance on the refiner, conche, or both.

SUMMARY OF THE INVENTION

The present invention pertains to use of a vibratory media mill for simultaneously mixing and grinding fat based slurries, dispersions, and emulsions, such as are found in chocolate manufacture, thereby reducing reliance on conventional refiners and/or conches. Vibratory media mills are already commercially available and, compared to prior art equipment conventionally used in chocolate manufacture, like the five-roll refiner, the MacIntyre refiner/conche, or the ball mill used in the Wiener process, are relatively inexpensive. Vibratory media mills can be adapted to chocolate manufacture with minimal modifications, and are relatively easy to maintain and operate when compared with now widely used chocolate-making equipment. It has been surprisingly found that the reduction in particle size of the raw materials in the chocolate recipe such as cocoa solids, milk solids and sugar, can be accomplished with intimate mixing of the solids with the fat phase in a single vibratory media mill unit.

Accordingly, in one aspect, the invention is a method for simultaneously mixing and grinding a particulate, fat-based starting composition having a fat phase and a non-fat phase, comprising providing a container mounted on springs to allow oscillatory or vibratory motion of it; providing means for imparting oscillatory or vibratory motion to the container; partially filling the container with inert media (which may be, for example, metal rods), introducing the fat phase and the non-fat phase into the container; and imparting oscillatory or vibratory motion to the container and the media to simultaneously reduce the particle size of the starting composition and intimately mix the fat phase and the non-fat phase to form an edible product.

In another aspect, the invention is a method of making chocolate which comprises: (a) providing a container; (b) partially filling the container with inert media; (c) introducing components of a particulate chocolate recipe into the container; (d) vibrating the container and the media to form a transformed chocolate mixture; and (e) removing the transformed chocolate mixture from the container.

In another aspect, the invention is a system for making chocolate wherein a vibratory media mill has been adapted to accomplish the simultaneous mixing and grinding of ingredients of a chocolate recipe. In particularly preferred embodiments, the system produces high quality chocolate without using a roll refiner (or other dry grinding apparatus) or conche.

DETAILED DESCRIPTION OF THE INVENTION

Vibratory media mills are known and have been used to perform processes outside the food industry. A typical mill is disclosed in U.S. Pat. No. 3,774,855 for example. Such equipment has been used to process plastic, minerals and other non-edible materials. The use of this type of equipment to process coal is described in U.S. Pat. No. 4,753,660. However, this technology has not heretofore been adapted to the combined mixing and grinding of fat-based edible materials, or to manufacture of chocolate in particular.

The basic structure of a vibrating media mill comprises a container mounted on a resilient structure such as springs or the like, and connected to one or more motors that can impart a vibrating or oscillating motion to the container. The container is partially filled with inert media (which may consist of balls, random packing materials, short bars with rounded ends, or preferably elongated rods) such that a head space remains in the container above the media. The container may also have compartments and one or more of the compartments may contain such media. The media preferably fill about 10 percent to about 50 percent of the container, and more preferably about 20 to about 30 percent of the container. Oscillation or vibration of the container mounted on the springs causes the media within the mill to vibrate with various media components tumbling over each other. The tumbling action results from forces that are applied to the media at various points on the walls of the container by the action of a motor or motors. Acting as a fluid mass, the media allow the larger particles to be processed by being mixed and ground and to quickly pass to the inner container surface and the area of highest impact pressure. As such particulate material moves with the media, it is thus constantly exposed to new impact surfaces. Accordingly, when the container is vibrated, the media simultaneously grind and mix particulate material with any other ingredients present. The ingredients are transported by gravity downward and through the mill.

The presently most preferred embodiment of the container found in the vibratory media mill of the present invention is in the form of a horizontally oriented cylindrical drum. Commercial models of this design, which may be adapted for use in the processing of ingredients of a chocolate recipe, are available under the tradename VIBRADRUM from General Kinematics of Barrington, Ill. Drums may be found in sizes ranging from about 2 feet (0.61 m) in diameter by 6 feet (1.83 m) in length, to about 6 feet (1.83 m) in diameter by 24 feet (7.32 m) in length. The length to diameter ratio is typically about 3:1 to about 4:1. The drum is mounted on springs and can be made to vibrate by the motor or motors operating in conjunction with a tuned mass at a natural frequency, typically about 10 Hz to about 30 Hz, with a maximum displacement on the order of about ½ inch (1.27 cm) to about 1 inch (2.54 cm). The desirable power of the motor or motors used to vibrate the drum depends on the size of the drum, and generally ranges from about 25 kilowatts (kW) per cubic meter of drum volume for smaller units down to 7 kW per cubic meter for the larger machines. Because the mill includes a drum that oscillates at its natural frequency, the mill does not require a special foundation or base, but rather can be mounted on a floor without anchors.

The vibratory media mill may be operated either continuously or in batch mode. In some embodiments, the drum is provided with plates which partition the drum into compartments or process zones and which have holes therethrough so that the compartments can communicate. By providing separate compartments in a continuously operated drum, different components of the chocolate recipe can be introduced into the different compartments so as to approximate successive additions in a batch process. The plates also discourage product from riding on top of the bars and prematurely discharging without being processed. If desired, a conduit may be provided to remove chocolate recipe ingredients from one of the process zones, to subject the ingredients to a heat tempering treatment for example, and then return the tempered ingredients to the same or another process zone.

Figure 1:
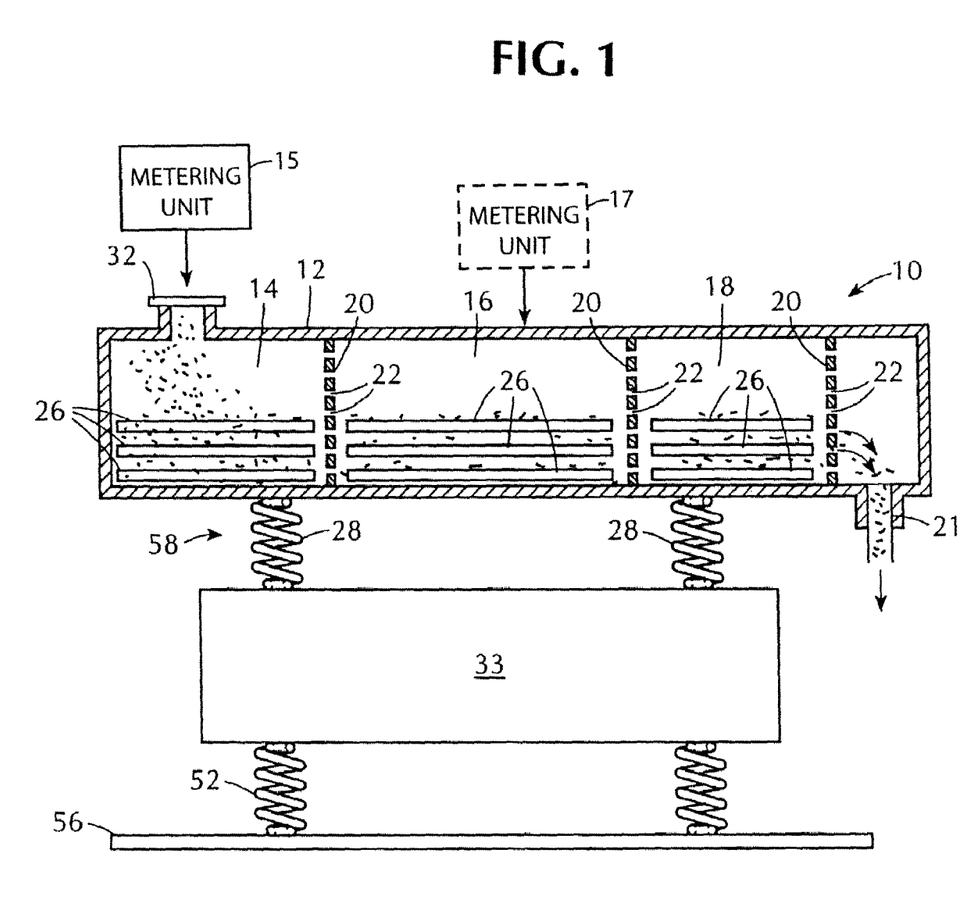
FIG. 1 is a schematic view of a vibratory media mill used in accordance with a preferred embodiment of the present invention.

A preferred arrangement is shown in FIG. 1, wherein mill 10 includes a container in the form of a cylindrical drum 12, divided into three chambers 14, 16, and 18 by partitions 20. Raw materials are typically fed via metering unit 15 to first compartment 14 through an inlet tube 32, although ingredients can be added to other compartments also using additional metering units. (for example, metering unit 17). Each of the partitions is formed with a number of product transfer holes 22 therethrough. Media in the form of cylindrical rods 26 are carried in each of the compartments, typically in such quantity as to occupy about 20% to about 30% of the interior volume of each compartment (of course, not all of the compartments need contain media). The drum is mounted on support springs 60 (shown in FIG. 2) and reactor springs 28, which are operatively coupled to a vibratory drive motor operating in conjunction with a tuned mass to vibrate the drum at its natural frequency. The motor and tuned mass are shown together in FIG. 1 as a single element 33. The motor is isolated from a stationary foundation 56 by isolation springs 52. Discharge tube 21 for product removal is located in a final compartment which does not have media in it and is separated from the rod mill by another partition 20.

Figure 2:
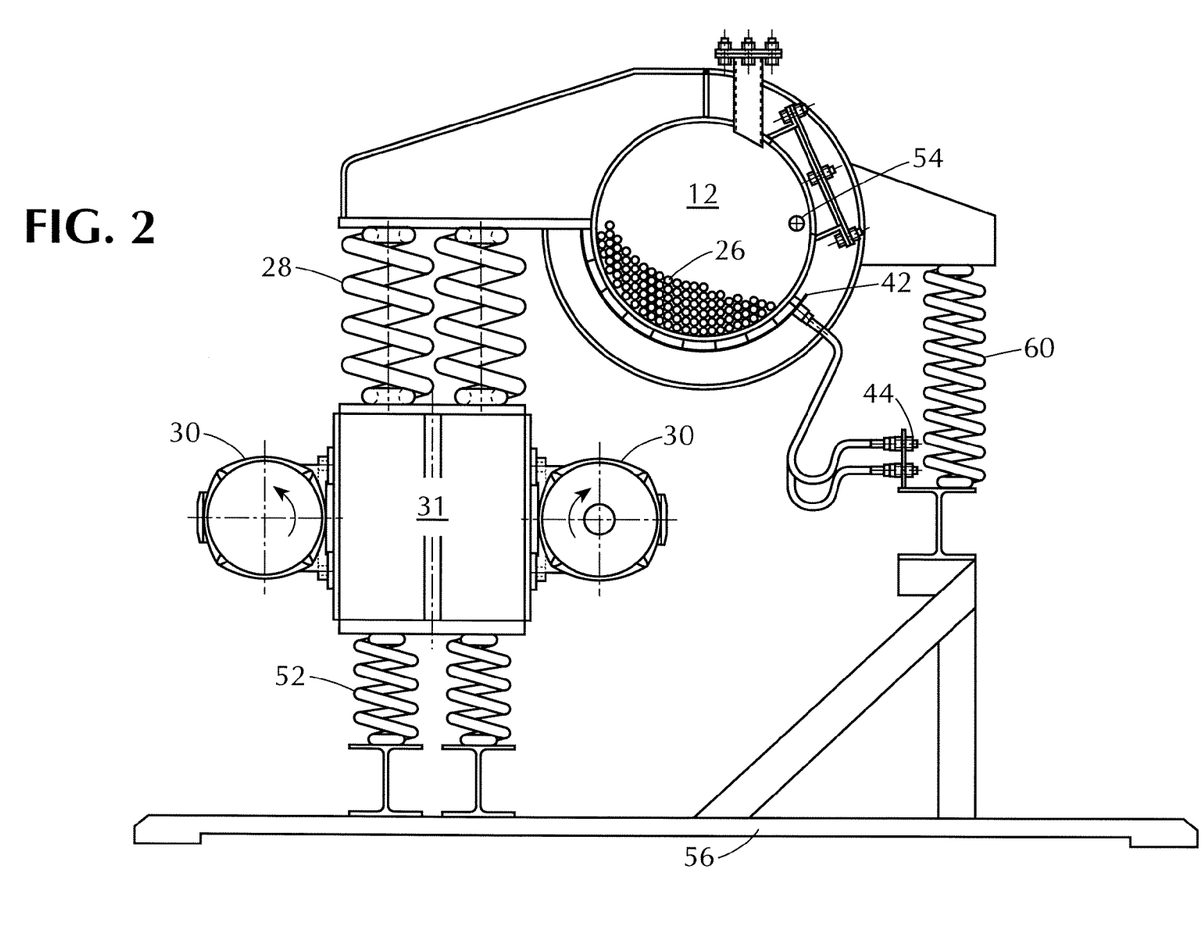
FIG. 2 is a cross sectional view of a vibratory media mill according to the invention from a perspective perpendicular to the view taken in FIG. 1.

In the cross sectional view of FIG. 2, the motors 30 and tuned mass 31 are shown separately. The motors 30, tuned mass 31 and reactor springs 28 impart motion to the drum around center of vibration 54.

Figure 3A:
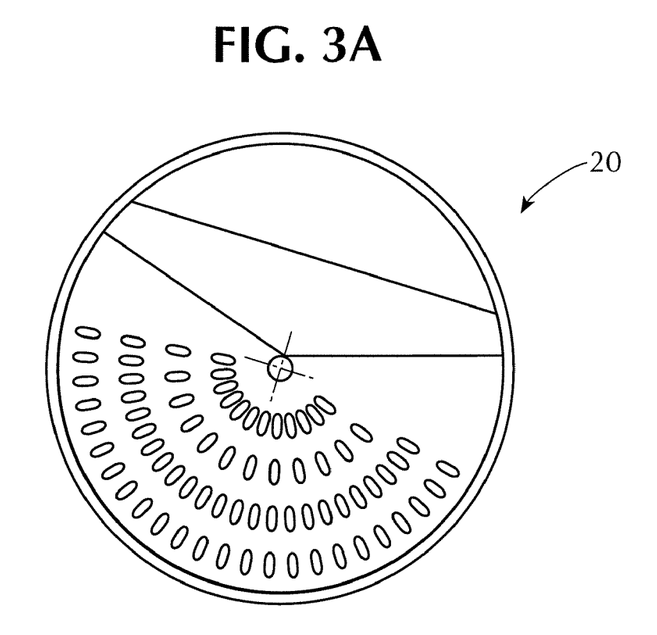
FIGS. 3a and 3b depict a partition for dividing the mill into process zones and having adjustable openings shown in an open and closed position, respectively.
Figure 3B:
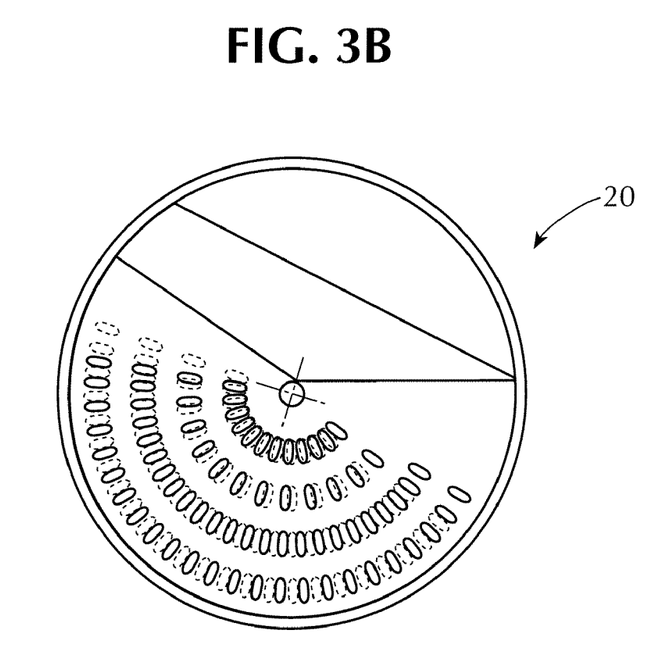

In some cases it is desirable to control the size of the openings in the partition plates 20 to regulate the level of material in the mill. This may be accomplished with rotating plates having matching openings as shown in FIG. 3a and FIG. 3b. When the openings in the respective rotating plates align, the holes are at their full open position, as shown in FIG. 3a. As one of the rotating plates is moved with respect to the other, the size of the openings are reduced until the openings reach a full closed position, shown in FIG. 3b. This configuration may be particularly useful in a test unit, where it is desired to determine the optimal size of opening for the desired emulsion to be ground. In a production unit, the size of the openings is more likely to be fixed, as this reduces the overall complexity of the unit. The level of product in the mill can also be controlled by injecting air into the mill to push the product out through the discharge tube.

Adapting a commercially available vibratory media mill to the processing of edible materials, such as chocolate, may require the addition of a heater or cooler, such as a fluid jacket 42 mounted to the wall of the container as shown in FIG. 2, fed with heating or cooling fluid via conduits 44. Alternatively, a radiative heater could be attached to a wall of the drum. In the manufacture of chocolate, the temperature is generally maintained in the range of about 40 C to about 55 C, depending on the type of chocolate being processed. Typically, the same temperatures that would be used in a conche are acceptable in carrying out the method of the invention. In some instances, where different materials are added in different compartments in the drum, it is desirable to provide different heating and cooling controls to each compartment or process zone of the drum.

It would be apparent for a person skilled in the art of chocolate making that the relative order of addition of ingredients into the vibratory mill could offer specific advantages. For example, it is a well known practice in conching to mechanically work the chocolate ingredients extensively before adding the lecithin emulsifier. This is called dry conching. This dry conching could be mimicked in the vibratory mill by adding the lecithin after a certain amount of mixing in batch mode or by adding the lecithin in a second process zone while operating in continuous mode. The dry conching is typically performed before the final percentage of cocoa butter has been added. The theory behind dry conching is that more beneficial mechanical energy can be added to the mass before the viscosity decreases too much. The drier, more crumbly state of chocolate during dry conching also presents more surface area to the air to allow for volatilization of off flavors and evaporation of excess moisture. The final recipe level of cocoa butter and lecithin can be spread out as desired over a long time, or over an increased length of the vibratory mill. Mechanical working of the chocolate at lower viscosity created with final lecithin and cocoa butter addition is called wet conching. Wet conching helps reduce the viscosity of the mass and creates a smooth texture by homogenizing the mixture well and evenly coating all the solid particles with fat.

In some embodiments, a vacuum is drawn in the container such that the head space over the ingredients and the media is at less than atmospheric pressure. This may assist in the evaporation of volatile constituents, development of flavors, evaporation of water and removal of off notes.

The vibrating media mill in accordance with another embodiment of the present invention may incorporate a container in the form of a cylindrical pan. Cylindrical pan vibrating media mills have torroidal bottoms, and are typically used in sieving and polishing applications. Commercial models of this design, which may be adapted for use in the processing of fat-based edible products, are available from Sweco Corporation, Florence, Ky.

The media used in each of the embodiments of the present inventions are "inert" in the sense that they are not substantially reactive with the recipe ingredients. Typically the media are metal and may be any convenient size or shape or any combination of sizes and shapes. In general, higher density media are preferred to maximize the grinding forces. To some extent, the selection will depend on the fat-based slurry or emulsion being processed. In the manufacture of chocolate, the most preferred media for use in conjunction with the vibratory drum are long cylindrical rods of the type described in U.S. Pat. No. 3,774,855 (Wolf). If cylindrical rods are used, they are preferably long enough to extend almost the full length of the drum (or if partitions are used, the length of each process zone), and are axially aligned in the axial direction of the drum. If the drum is partitioned into compartments by perforated plates, then the rods should preferably extend almost the full length of each compartment. Thus, for example, a six foot long drum could be partitioned into three compartments of equal length, each containing rods that are somewhat less than 24 inches (0.61 m) in length depending on the thickness of the partitions and play desired between the partitions and the ends of the rods. The diameter of the rods preferably ranges from about ¼-inch (0.64 cm) to about three inches (7.62 cm) with about ½-inch (1.27 cm) to about 1 ½ inch (3.81 cm) diameter rods being more preferred, and about 1 inch (2.54 cm) or about 1 ¼ inch (3.175 cm) diameter rods being most preferred. It is also desirable to use rods of the smallest diameter practicable, with larger rods needed for higher viscosity slurries to enable sufficient rod movement. Alternatively, mixed media such as smaller bars, balls, spheroids, random packing material, or any combination of such objects can also be used.

It is contemplated that any fat-based slurry or emulsion may be processed in the vibratory media mill. While such mills have been used extensively in the prior art to grind non-edible materials, the ability to mix intimately the phases of edible fat-based particulate materials has not previously been recognized. The mixing and grinding method and system of the present invention may be used to process relatively low fat and/or full fat compositions. As used herein, "relatively low fat" refers to a composition having up to about 25 percent by weight of fat, i.e., generally a fat content that is lower than the fat content of a composition ordinarily processed in a conche. The term "full fat" refers to compositions that have too much fat to be readily processable in a dry grinding operation such as a roll refiner or air classification mills. "Full fat" is generally considered to be greater than about 25 percent by weight of fat, and often greater than about 30 percent by weight of fat. In the preferred embodiments, the compositions processed in the mill are full fat.

In the preferred embodiments, the materials processed in the mill are ingredients of a chocolate recipe. Chocolate recipe ingredients include cocoa powder, milk powder, sugar, cocoa butter and lecithin, as well as other ingredients which are sometimes used in chocolate in lesser amounts, including added fats and oils, preservatives, flavorants, micronutrients, and the like. The above ingredients may be provided in any form, for example, as chocolate paste from a refiner, together with added cocoa butter, or as crumb with added cocoa butter. Preferably, however, the chocolate recipe ingredients are provided as raw materials, namely cocoa liquor, milk powder, sugar, cocoa butter, and a small amount of lecithin. Such ingredients are usually individually metered or measured. In the preferred embodiment of the invention, the ingredients may be individually metered into the vibratory media mill at different points along the length of the container or drum to approximate the timing of addition of ingredients in a conche-based batch process.

It is contemplated that the materials processed in the mill preferably have at least about 25 percent by weight fat content, otherwise there would be little or no reason to conche them. However, the use of the vibratory media mill in accordance with the invention is not limited to chocolate compositions. A typical milk chocolate may comprise about 40 percent by weight sugar, but a reasonable range for a material processed in the mill ranges between zero percent by weight added sugar (more typically 24 percent by weight for "bitter" chocolate) up to about 75 percent by weight (which amount might be suitable for an icing composition, for example). A typical chocolate composition might contain 30 percent cocoa butter; however, a composition which could be processed in the vibratory media mill may range from about 18 percent by weight cocoa butter (in a low fat chocolate composition) up to almost 100 percent by weight cocoa butter (to make a filling material, for example). Likewise, while 18 percent by weight milk solids is a typical amount for a milk chocolate, dark chocolate contains little milk fat and about zero percent by weight dry milk solids, while so-called "white chocolate" may contain up to about 40 percent by weight milk solids. These materials are also suited for grinding in the mill. Conversely, suitable white chocolate compositions for grinding contain virtually no cocoa solids, whereas dark chocolate may contain up to about 20 percent by weight cocoa solids. The foregoing are preferred ranges for each of these ingredients to be used according to the invention, and typical chocolate recipes fall within these ranges.

A portion of the material fed to the vibratory media mill may also be so-called "rework" chocolate, which is chocolate that has already been made, or combined with other non-chocolate ingredients such as nuts or caramel but which fails to meet some prescribed specification (as, for example, with regard to molded confection shape). Rework chocolate can be combined with other finished chocolates or with chocolate recipe ingredients to make finished chocolate. An important consideration when grinding rework chocolate is the viscosity of the mass in the vibratory grinder. It is often desirable to dilute higher viscosity rework material with lower viscosity virgin chocolate (i.e. chocolates without rework). This delivers a lower viscosity material which is more effectively ground. It may be desirable in some instances to provide a conduit for removing transformed chocolate mixture from a discharge area of the mill and direct a portion of this mixture to an upstream portion of the mill.

An important advantage of the present invention is that the vibrating media mill simultaneously performs grinding and mixing of a fat based slurry or emulsion.

The average particle size of chocolate recipe ingredients is reduced to about the 5 to 100 micron range, preferably to about the 15 to 40 micron range, by the grinding performed in accordance with the present invention. According to the prior art, grinding of relatively low fat chocolate precursor paste to particles of this size would result in an increase in viscosity. However, the combination of the grinding with intimate mixing of the fat phase (such as cocoa butter) and non-fat phase (such as cocoa solids and sugar) of the composition, results in the formation of a fluid product. The fluidity and viscosity of chocolate or other fat based emulsion resulting from the mixing performed in accordance with the present invention is related to the degree to which and the manner in which the fat is coated on the solid particles. These properties cannot be adequately described by a single number. In general, however, the viscosity of chocolate processed in a vibratory media mill is comparable to chocolate processed in a conche, that is on the order of about 5,000 to about 50,000 cp.

The physical and textural properties of an edible, fat-based slurry or emulsion depend on the size of particles in the mixture, the fat content, and the degree to which the solid particles are mixed in the fat phase. In accordance with the invention, grinding to reduce particle size and mixing ingredients intimately are related but distinct operations. It has been found that reducing particle size of particulate material and intimate mixing of the ingredients can be accomplished at the same time in a vibratory media mill.

The spring diameter, displacement imparted by the motor and vibration frequency will also change the impact zones in the container, or compartments in the container comprising the mill, which will also affect particle size. Without wishing to be bound by theory, and recognizing that other variables play a role, it is believed that the most important factor controlling the particle size is the grind time in the machine. There is a general inverse relationship, with smaller particles requiring proportionally longer times to achieve.

The impact of both particle size distribution and the shape of individual particles on chocolate properties has been discussed in the literature. The vibratory grinding process can be designed to shift the chocolate particle size distribution into any desired specification. An important consideration to remember is that the vibratory grinding process is a statistical operation, in which each individual feed particle goes through a slightly different treatment history and time in the grinder. As the continuous vibratory grinder has similarities to a continuous stirred tank reactor (CSTR), many of the engineering aspects from the CSTR literature can be adapted to optimize the grinding process.

An important process variable that drives the particle size distribution is media diameter. Larger diameter rods/balls can exert greater crushing forces due to their greater mass. This can yield more ultra fine particles and create sufficient forces to grind extra large granules present in the feed stream. Smaller diameter rods/balls may tend to more quickly reduce the average particle size and create a narrower particle size distribution. In general, a minimal size diameter rod/ball is needed for grinding more viscous slurries in order to overcome the dampening effect. Smaller rods/balls may also have a tendency to create rounder and smoother surface particles because of their greater surface area or milder action.

Another process variable that can be used to drive the particle size distribution is the mixtures of media sizes. A mixture of rod/ball sizes can be used to reduce the void volume or deliver a compromise of benefits from each rod/ball size. The reduction of void volume can create a narrower particle size distribution. Because of mechanical stresses and wear issues that would be exerted on the rods and drum, it is not preferable in most instances to mix rods and balls together in the same grinder zone. There could certainly be benefits to using rods in one compartment and balls in another compartment simultaneously.

Yet another process variable is the length and diameter of the mill and number of partitions. The grinder geometry and configuration can be used to reduce the residence time distribution and therefore narrow the particle size distribution. The residence time distribution effect is based on an analysis of the length (L) to diameter (D) ratio (L/D). A higher L/D ratio and the use of partitions along the length of the container can prevent the short-cutting of inlet particles directly to the outlet. This can narrow the residence time distribution and therefore reduce the corresponding particle size distribution. Typical commercial vibratory grinders have an L/D ratio of 3. The machines can be reengineered to an L/D ratio of 4 without a significant increase in relative cost per volume of machine.

Another advantage is achieved by filtering of chocolate and multi point removal of chocolate along the length of the mill. In order to create a chocolate with a very controlled particle size distribution, filtering systems can be utilized. Equipment such as that manufactured by Russel Finex of Charlotte, N.C. under the brand name "Russell Eco Self Cleaning Filters" can be utilized for this application.

These filters contain a cylindrical screen with a selectable grid hole size ranging from 10 microns to upwards of 1,000 microns. The material to be filtered is pumped into the inside of the filter. The pressure differential across the screen pushes the continuous phase fluid and the particles smaller than the screen opening through the screen to the "under size" discharge. The larger particles cannot fit through the opening and are swept by a motorized scraper to the "over size" discharge.

The chocolate slurry at any point along the length of the mill or at the end can be removed and filtered. The "under size" fluid stream can continue on for further processing or into a hold/mix tank. The "over size" discharge fluid stream can be returned back into the vibratory media mill at any desired point for further processing. It may be beneficial to pump the "over size" fluid stream back to the mill at a volumetric rate which allows for the dispersion of the large particles in a matrix of the unfiltered fluid slurry.

The partitioning of the inlet fluid between "under size" and "over size" varies widely depending on the desired results and conditions. It would typically be expected that to minimize equipment costs, the percentage by weight of solid particles being "over size" filtered at the mill discharge is in a range of about 0.1% to about 99%, more preferably about 10% to about 90%, and most preferably about 25% to about 75%.

One or several filters of selectable pore size and one or multiple mills could be operated simultaneously. It may be possible to combine these assorted pore size filter streams at specified mass flow rates to create a chocolate stream of very controlled particle size distribution.

Assorted operational parameter setpoints can be adjusted to modify the particle size distribution. As previously discussed, the frequency of vibration and the stroke length can be readily adjusted by the motor settings. Directionally, higher machine acceleration forces can deliver finer particles because of the higher impact forces.

Modification of the slurry consistency can also impact the grinding and/or conching efficiency of the vibratory process. It has been noted that some minimal slurry particles content of approximately 5% by weight is required to generate the required friction between the drum and rods to generate good rod circulation. At the same time, a slurry viscosity exceeding 50,000 centipoise can dampen the rod vibration and reduce the grinding and rod circulation effect. This can result in a wider than desired particle size distribution.

EXAMPLE

A process according to the invention was performed on a fat-based slurry in a vibratory media mill configured substantially as shown in FIG. 1. A slurry of chocolate recipe raw materials was pre-mixed by hand having the following percentage by weight (wt %) composition: about 10.0 wt % defatted cocoa powder; about 18.0 wt % defatted milk powder; about 40.5 wt % sugar, about 31 wt % cocoa butter, about 0.3 wt % lecithin, about 0.1 wt % salt and about 0.1 wt % natural and/or artificial flavors. The raw materials were metered together and fed into the first compartment of a three-compartment mill at a rate to provide a throughput of about 2.5 kg/min of finished convenience chocolate. The drum was driven to vibrate by the motor to grind and mix the raw materials of the slurry, which was extracted from the drum through a discharge tube.

The finished convenience chocolate was smooth and homogeneous, with an average particle size of about 40 microns. Sensory tests compared chocolate made in a pre-existing chocolate plant using an air classified mill particle size reduction unit and Teledyne-Reco twin screw processor, with chocolate made according to the foregoing example. The sensory evaluation gave a degree of difference (DOD) of 2, indicating only minimal flavor and texture impact results when using the vibratory mill technology.

Similar results were achieved when the vibratory mill processed chocolate was compared to chocolate ground in a roll refiner and conched in a Petzholdt conche.

While the present invention has been described with respect to what are presently considered to be the preferred embodiments, the invention is not to be limited to the disclosed embodiments. Rather, the present invention encompasses various modifications and equivalent arrangements included within the spirit and scope of the appended claims. The scope of the appended claims is to be accorded the broadest interpretation so as to encompass all such modifications and equivalent structures and functions.

We claim:
1. A system comprising:
a cylindrical drum having a central longitudinal axis and a curved inner surface and mounted on springs;

a motor and tuned mass coupled to the cylindrical drum to vibrate the cylindrical drum about a center of vibration that is offset from the central longitudinal axis of the cylindrical drum; and at least one pair of partition plates disposed at an angle to the longitudinal axis of the cylindrical drum to divide the cylindrical drum into at least two process zones, the partition plates of the at least one pair having matching apertures and moveable relative to each other between a first position where the apertures are aligned and a second position where the apertures are misaligned.

2. A system according to claim 1, wherein the longitudinal axis extends in a horizontal direction.

3. A system according to claim 1, wherein the at least one pair of partition plates are disposed at a right angle to the longitudinal axis.

4. A system according to claim 1, wherein the at least one pair of partition plates rotate relative to each other.

5. The system according to claim 1, wherein the cylindrical drum has an inlet end and a discharge end, and the at least one pair of partition plates are spaced from the inlet end and the discharge end.

6. The system according to claim 5, comprising at least one additional pair of partition plates, the partition plates of the at least one additional pair having matching apertures and moveable relative to each other between a first position where the apertures are aligned and a second position where the apertures are misaligned, the at least one pair of partition plates spaced from the at least one additional pair of partition plates to define at least three process zones in the cylindrical drum.

7. The system according to claim 1, wherein the system comprises media carried in the cylindrical drum.

8. The system according to claim 7, wherein the media comprises cylindrical metal rods.

9. The system according to claim 8, wherein the cylindrical metal rods are aligned parallel to the longitudinal axis of the cylindrical drum and extend the length of each of the at least two process zones.

10. The system according to claim 1, comprising at least one chocolate recipe ingredient metering unit for metering chocolate recipe ingredients into the cylindrical drum.

11. The system according to claim 10, comprising at least two chocolate recipe ingredient metering units each metering chocolate recipe ingredients to one of the at least two process zones.

12. The system according to claim 11, wherein each of the at least two chocolate recipe ingredient metering units provides a different ingredient to the one of the at least two process zones.

13. The system according to claim 1, comprising at least one heater or at least one cooler mounted on the cylindrical drum.

14. The system according to claim 13, wherein the at least one heater or at least one cooler is mounted on the cylindrical drum opposite the center of vibration.

* * * * *